No. 788,860. PATENTED MAY 2, 1905.
G. B. UCKER.
CORN PLOW AND CULTIVATOR FENDER ADJUSTER.
APPLICATION FILED MAY 31, 1904.

Witnesses:
R. E. Hundley
Willad M. Gatt

Inventor:
George B. Ucker
by J. L. Heise, Atty

No. 788,860. Patented May 2, 1905.

UNITED STATES PATENT OFFICE.

GEORGE B. UCKER, OF CIRCLEVILLE, OHIO.

CORN-PLOW AND CULTIVATOR FENDER-ADJUSTER.

SPECIFICATION forming part of Letters Patent No. 788,860, dated May 2, 1905.

Application filed May 31, 1904. Serial No. 210,428.

*To all whom it may concern:*

Be it known that I, GEORGE B. UCKER, a citizen of the United States, residing at Circleville, in the county of Pickaway and State of Ohio, have invented certain new and useful Improvements in Adjusters for Fenders Used on Corn-Plows and Cultivators of all Kinds, of which the following is a specification.

My invention relates to improvements in fender-adjusters for corn-plows and cultivators for various agricultural crops in which the adjuster is attached to the beam of the implement and is regulated by means of a thumb set-screw; and the objects of my invention are ease, facility, and rapidity in attaching and removing the adjuster to the implement and also in attaching and removing the fender to the adjuster; facility and rapidity in raising and lowering the fender to gage it to the size of the corn or other crop that is being cultivated, (it may be adjusted any fraction of an inch or more at a time, while other adjusters move the fender a certain fixed distance each time;) to attach it to the beam of the implement without making a hole through said beam, thus avoiding the weakening of the beam and leaving it with all its original strength. It may be attached at any part of the beam that may be required without making a hole in said beam. It differs from the old methods of adjusting the fender in that no wrench need be carried or used, no nut loosened, but may be adjusted at any time or place with the hand. I attain these objects by the mechanism illustrated in the accompanying drawings, in which—

Figure 1:
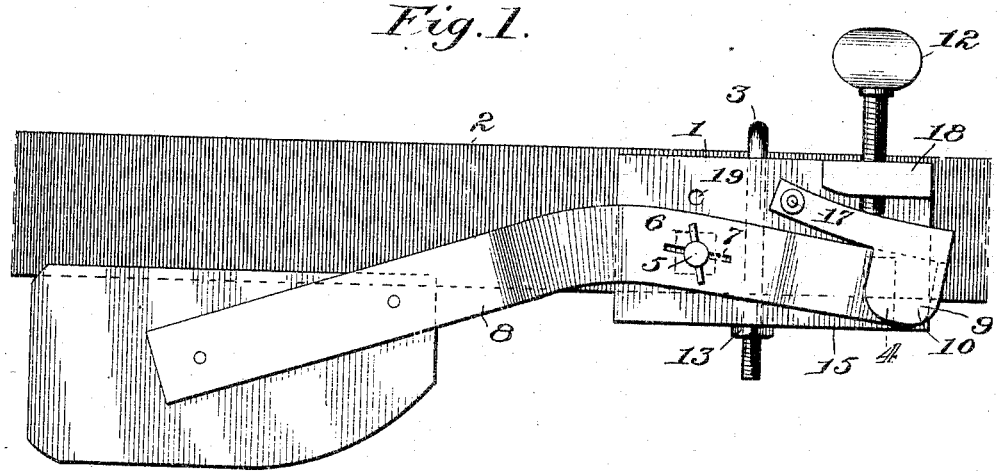
Figure 2:
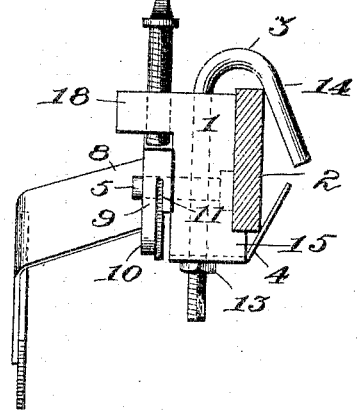

Figure 1 represents the adjuster with the fender attached to the beam of the implement ready for use. Fig. 2 is a view of the front end of the adjuster.

Similar figures refer to similar parts throughout the different views.

1 is the main body of the adjuster.

2 is the beam of an implement to which the adjuster may be attached.

3 is a rod-hook which goes perpendicularly down through a hole in the main body of the adjuster and is tightened on the lower side by the use of a nut 13. The hook at the top of said rod widens as it descends from its turn, as shown at 14, so that it will grasp tightly different-sized beams, and is made to hold securely on any-sized beam by tightening the nut at 13.

4 is a hook fastened in the lower side of the body of the adjuster and extends outward and then upward and grasps the beam of the implement on the lower side upward and braces or tightens against the rod-hook 3.

15 is a flange extending along the lower side of the body of the adjuster and also bracing against rod-hook 3 by facing on the lower side of the beam of the implement.

9 is the adjusting-bar, grooved on a part of its under side, as shown at 11, to admit the upper edge of the end of the arm of the fender and has an ear 10 on its outer side at its forward end, so as to admit the end of the fender-arm 8 to play up and down to adjust the fender to the ground it is passing over. This said bar fastens at its other end, 17, to the body with a bolt, on which it pivots, thus giving its other (outer) end an up-and-down movement.

12 is a thumb-screw passing through a hole in a flange 18 on the body and presses with its lower end on the bar 9. To raise the fender, run this thumb-screw down. This presses the free end of adjusting-bar 9 down, carrying with it the end of the arm 8 of the fender, which arm pivots on the bolt 5, which raises the fender at its other end. To lower the fender, run the thumb-screw up. In this manner the fender may be adjusted any fraction of an inch or more, as desired.

5 is a bolt passing through a hole in the body of the adjuster, having its head countersunk on the side of the body next to the beam, also having its head or shoulders square, so as to prevent the bolt's turning, thus keeping the pin 6, which passes through a hole in the outer end of the said bolt, in the same position constantly—nearly perpendicular.

7 is an elongated slot extending longitudinally near the end of the arm of the fender and is of sufficient length and width to pass over the pin or key 6 and has a sufficiently rounded enlargement in its middle part to pass over the bolt 5. To attach the fender, raise it to nearly a perpendicular position and slip the slot over the bolt and pin, then bring the fender down to its natural position, as shown in Fig. 1, and the arm will rest on the bolt between the pin and the face of the body of the adjuster, and the upper edge of the end of the arm will take its place in the groove 11 in the adjusting-bar 9.

The said adjuster may be detachably secured to the beam of the implement by means of a bolt passing from it through a hole in the beam of the implement, as shown at 19.

Having thus described my invention, what I claim, and desire to secure by Letters Patent, is—

1. A fender-adjuster which faces against the side of the beam of the implement, and has a flange projecting from one of its inner edges next to the beam, which flange faces against one of the edges of the implement-beam and also another flange projecting from the upper face outward from said beam and extending along a part of the length of the adjuster, said latter flange being provided with a thumb set-screw passing through a threaded hole in it and adapted to adjust the fender, substantially as set forth.

2. In a fender-adjuster, the combination with the adjuster having a flange projecting from one edge next to the beam and also a flange projecting from the upper outer face of the adjuster opposite the beam and being provided with a thumb set-screw adapted to adjust the fender, of an adjusting-bar grooved on a part of its under side at its free end and provided with an ear extending downward from the outer side of said groove, and detachably and pivotally secured at its other end to the adjuster, substantially as set forth.

3. The combination with the adjuster of the character described, of a bolt having a square head, or shoulder, countersunk on the side of the adjuster next to the implement-beam and passing through a hole in said adjuster to its opposite side from which it projects and is adapted to receive the arm of the fender, substantially as set forth.

4. The combination with the adjuster of the character described, a bolt having a square head, or shoulders, countersunk on the side of the adjuster next to the implement-beam passing through it and projecting outward from its side opposite the beam and being adapted to receive the arm of the fender, of a pin passing through a hole in said bolt near its outer free end; said pin being nearly perpendicular and parallel to the outer face of the adjuster, substantially as set forth.

5. The combination with the adjuster comprising a flange projecting from its inner lower edge next to the beam and one projecting from its upper outer face containing a thumb set-screw, the said adjuster having a bolt pass through it and project from its outer side opposite the beam, said bolt having a square head, or shoulder a key passing through a hole in it near its outer free end, nearly perpendicular and parallel to the outer face of the adjuster, of the fender having an oblong aperture in its arm, which aperture has a round center, the whole aperture being adapted to pass over said pin and to have the round part rest around said bolt, substantially as set forth.

6. The combination with the adjuster, of a hook attached to it which gradually widens from its turn to its lower end and is adapted to grasp implement-beams of different sizes, substantially as set forth.

7. The combination with the fender-adjuster, of two hooks, the one extending from the upper and the other from the lower edge of said adjuster and adapted to grasp the implement-beam between them, substantially as set forth.

8. The combination with a fender-adjuster having a flange projecting from its lower inner edge next to the beam and one from its upper outer face opposite the beam, a thumb set-screw set in the latter flange, of a bolt passing from the adjuster through a hole in the implement-beam and securing it thereto, substantially as set forth.

9. The combination with a fender-adjuster having a flange projecting from its lower inner edge next to the beam and one from its upper outer face opposite the beam, a thumb set-screw set in the latter flange, of a bolt with a square head, or shoulders, countersunk on the inner side of the adjuster and adapted to receive the arm of the fender on the opposite side of said adjuster, substantially as set forth.

10. The combination with the fender-adjuster having a flange projecting from its lower inner edge next to the beam and one from its upper outer edge opposite the beam, the latter containing a thumb set-screw, a bolt with square head or shoulders, countersunk on the inner face of the adjuster next to the beam and adapted to receive the fender on the opposite side of said adjuster, of a pin passing through an aperture near the outer free end of said bolt and adapted to secure the fender, substantially as set forth.

11. The combination with a fender-adjuster having a flange projecting from its lower inner edge next to the beam and one from its upper outer face opposite the beam, a thumb set-screw set in the latter flange, a bolt with square head or shoulders, countersunk on the inner face of the adjuster, passing through it and projecting from the opposite side, a pin passing through an aperture in said bolt near its outer free end, of an adjusting-bar pivotally attached at one end to the outer face of the adjuster, substantially as set forth.

12. The combination with the fender-adjuster having a flange projecting from its lower inner edge next to the beam and one from its upper outer face opposite the beam, a thumb set-screw set in the latter flange, a bolt with square head, or shoulders, countersunk on the inner face of the adjuster passing through it and projecting from its opposite face, a pin passing through a hole in said bolt near its outer free end and adapted to secure the fender on said bolt, an adjusting-bar pivotally attached at one end to the outer face of the adjuster, of a hook extending from one edge of the adjuster, whose grasp widens from its turn, substantially as set forth.

13. The combination with the fender-adjuster having a flange projecting from its lower inner edge next to the beam and one from its upper outer face opposite the beam, a thumb set-screw set in the latter, a bolt with square head, or shoulders, countersunk on the inner face of the adjuster, passing through it and projecting from the opposite side, a pin passing through a hole in said bolt near its outer free end, an adjusting-bar pivotally attached at one end to the outer face of the adjuster, of two hooks projecting, the one from the lower and the other from the upper edge, and adapted to grasp the beam of the implement between them, substantially as set forth.

14. The combination of the fender-adjuster having a flange projecting from its lower inner edge next to the beam and one from its upper outer face opposite the beam, a thumb set-screw set in the latter, a bolt with square head, or shoulders, countersunk on the inner face of the adjuster, passing through it and projecting from the opposite face, a pin passing through a hole in said bolt near the outer free end, an adjusting-bar pivotally attached at one end to the outer face of the adjuster, two hooks projecting, the one from the lower and the other from the upper edge of the adjuster and adapted to grasp the beam of the implement, of a fender having a long aperture with a round center in its arm, substantially as set forth.

15. The combination with the fender-adjuster having a flange projecting from its lower inner edge next to the beam and one from its upper outer face opposite the beam, a thumb set-screw set in the latter, a bolt with square head, or shoulders, countersunk on the inner face of the adjuster passing through it and projecting from its opposite face, a pin passing through a hole in said bolt near its outer free end, an adjusting-bar pivotally attached at one end to the outer face of the adjuster, a bolt passing from the adjuster through an aperture in the beam of the implement, of a fender having an elongated aperture with a round center in its arm, substantially as set forth.

In testimony whereof I affix my signature in presence of two witnesses.

GEORGE B. UCKER.

Witnesses:
M. A. RYAN,
N. D. MILLER.